United States Patent [19]

Marlow

[11] 4,018,457
[45] Apr. 19, 1977

[54] INFLATING DEVICE FOR USE WITH VEHICLE SAFETY SYSTEMS

[75] Inventor: Darrell W. Marlow, Herrin, Ill.

[73] Assignee: Olin Corporation, New Haven, Conn.

[22] Filed: Sept. 5, 1972

[21] Appl. No.: 286,361

[52] U.S. Cl. .............................. 280/735; 280/737; 222/5

[51] Int. Cl.² ......................................... B60R 21/08

[58] Field of Search ........... 280/150 AB, 737, 741, 280/742, 735, 736; 138/45, 46; 60/254, 26.1; 137/68; 222/5

[56] References Cited

UNITED STATES PATENTS

| 3,073,112 | 1/1963 | Bleikamp | 60/254 |
|---|---|---|---|
| 3,115,004 | 12/1963 | Scurlock | 60/26.1 |
| 3,167,912 | 2/1965 | Ledwith | 60/254 |
| 3,332,432 | 7/1967 | Marsh | 137/68 |
| 3,643,971 | 2/1972 | Kushnick | 280/150 AB |
| 3,674,059 | 7/1972 | Stephenson | 280/150 AB |
| 3,691,770 | 9/1972 | Nunn | 60/254 |
| 3,713,667 | 1/1973 | Blanchard | 280/150 AB |
| 3,715,131 | 2/1973 | Hurley | 280/150 AB |
| 3,758,131 | 9/1973 | Stephenson et al. | 280/150 AB |

*Primary Examiner*—Kenneth H. Betts
*Attorney, Agent, or Firm*—Donald R. Motsko; William W. Jones

[57] ABSTRACT

An inflating system of the type utilizing a propellant charge and stored fluid under pressure to inflate an inflatable member such as a vehicle safety bag. The propellant chamber in which the propellant burns is separated from the reservoir in which the fluid is stored by a nozzle member. Means is provided for reducing the throat area of the nozzle member upon actuation of the high or fast deployment of the system to increase the burning rate of the propellant charge.

1 Claim, 4 Drawing Figures

INFLATING DEVICE FOR USE WITH VEHICLE SAFETY SYSTEMS

BACKGROUND OF THE INVENTION

The present invention relates generally to the field of vehicle safety systems of the type utilizing an inflatable confinement. More particularly, this invention relates to an improved inflating system for inflating the confinement of such devices.

A great deal of effort is being given to the problem of increasing the safety of passenger vehicles. As well as trying to increase the safety of the vehicle itself, considerable effort is being given to the development of passive restraint systems which will protect the occupant of the vehicle from injury due to impact without the necessity of the occupant taking any positive action.

One type of passive restraint system which has been developed utilizes an inflatable confinement such as a bag which is automatically inflated in response to a predetermined condition such as an impact to or the upsetting of the vehicle to protect the occupant from contacting the interior of the vehicle and injuring himself.

The present invention is concerned with a vehicle safety system of the type which utilizes an inflatable confinement means, a stored fluid under pressure, and a propellant charge for the generation of hot gas. When a collision of the vehicle is sensed, the propellant charge is ignited and the hot gas resulting therefrom is caused to mix with the stored fluid and the mixture released to inflate the confinement. With systems of this type, under some circumstances if the safety bag is deployed too rapidly, there is a possibility of a high sound level which could be irritating and harmful to the occupant, a possibility of abrasion to the occupant due to bag contact, and the possibility of inducing trauma to the occupant.

SUMMARY OF THE INVENTION

The present invention has for one of its objects the provision of an inflation device for an inflatable confinement wherein the confinement can be deployed at either a slow rate or a rapid rate.

Another object of the present invention is the provision of an inflating device for inflating confinements of vehicle safety systems which under some circumstances has a reduced noise level and reduced passenger discomfort.

In accordance with the preferred embodiment of the invention, an inflating system of the type utilizing a propellant charge and a stored fluid under pressure is provided to inflate an inflatable member. The propellant chamber in which the propellant burns is separated from the interior of the storage means in which the fluid is stored by a nozzle member which controls the rate of urning of the propellant charge in the propellant chamber. Means is provided for reducing the throat area of the nozzle member upon actuation of the high or fast deployment of the system to cause an increase in the burning rate of the propellant charge.

DETAILED DESCRIPTION

Figure 1:
FIG. 1 is a partially broken away, fragmentary, side view of a vehicle equipped with safety device incorporating the present invention and showing one arrangement of such a system in the vehicle.

Referring to the drawings, and in particular FIG. 1, a system incorporating the present invention is shown mounted in a vehicle 2. The system includes an inflating unit 4 connected to an inflatable confinement 6 by means of a manifold 8. The confinement 6 in the example shown, is mounted in the dashboard 10 of the vehicle 2 in its deflated or collapsed storage position. The confinement 6 may be in the form of a flexible bag of rubber, cloth, or the like and may be vented in any known manner or may be non-vented if desired.

Collision sensing means 12 are attached to the vehicle 2 and are connected to the inflator 4 by suitable electrical connectors 14 and 16. The sensing means 12 are of the type which will produce an electric current when the vehicle is involved in a collision of a predetermined magnitude. As explained in more detail below, electrical leads 14 will carry a current from the sensing means 12 in response to a low level crash when slow deployment of the system is desired, while both leads 14 and 16 carry an electric current when the vehicle is involved in a high speed crash and fast deployment of the system is required. The electric current from the sensing means 12 serves to actuate the inflator 4 which in turn inflates the confinement 6 into its expanded condition as indicated at 6' to provide a cushion against which the occupant 18 of the vehicle 2 will impact.

Figure 2:
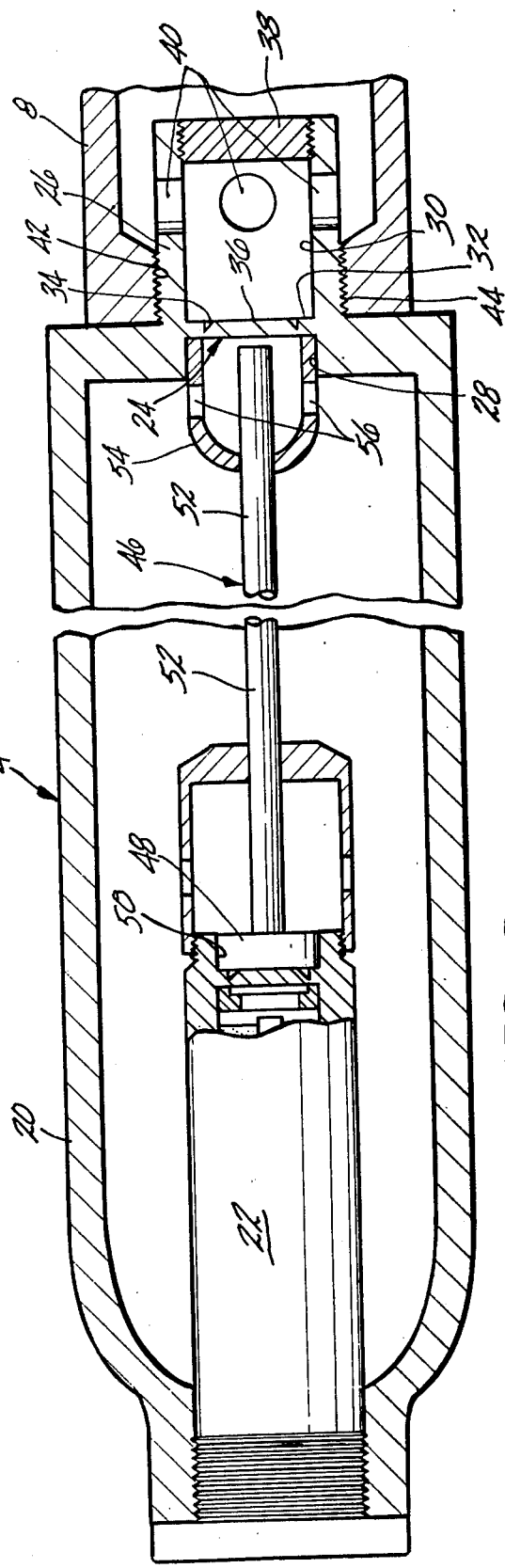
FIG. 2 is a partial cross-sectional view of the inflating unit incorporating the present invention.

The inflating unit 4 which is shown in greater detail in FIG. 2, comprises a fluid storage reservoir 20 in the shape of an elongated bottle fabricated from a high strength material such as steel, aluminum, or the like. The forward, or left hand end as viewed in FIG. 2 is reduced to the bottle like shape and is closed by a propellant storge means 22. The rearward end is closed by an integral portion of the reservoir 20 and includes an outlet portion 24. The outlet portion 24 of the reservoir 20 includes a rearward extension portion 26 formed integrally with the remainder of the reservoir 20. A recess or bore 28 extends rearwardly in the outlet portion 24 with its open end communicating with the interior of the reservoir 20. The bore 28 is separated from a bore 30 in the rearward end of the extension portion 26 by a web 32. The web 32 is provided with a circular groove 34 which forms a rupturable closure portion 36 closing the interior of the reservoir 20 from the manifold 8 and the inflatable confinement 6.

The bore 30 in the outlet portion 24 of the reservoir 20 has its open end closed by a plug 38 threadedly secured thereto. The walls defining the bore 30 have a plurality of apertures 40 therein, each aperture having an axis substantially perpendicular to the axis of the bore 30. The apertures 40 serve to diffuse the exiting gases and are so dimensioned so as to prevent the rupturable closure portion 36 from passing through the manifold 8 in the confinement 6 after it has broken loose from the web 32.

The manifold 8 is connected to the outlet 24 by means of an internally threaded portion 42 being connected to the threaded portion 44 of the rearward extension 26.

A rod member 46 extends from the inner end of the propellant storage means 22 to the bore 28 and terminates at a point slightly spaced from the rupturable closure portion 36. The rod member 46 includes an enlarged head portion 48 mounted in a bore 50 in the end of the propellant storage means 22. The elongated reduced portion 52 of the rod member 46 is supported adjacent its free end by a deflecting member 54 which has a plurality of apertures 56 therein, the axis of which are perpendicular to the axis of the outlet portion 24.

The interior of the reservoir 20 is adapted to contain a non-toxic fluid under pressure. Such fluid may be nitrogen, argon, helium, oxygen, or other suitable fluids or mixtures thereof.

Figure 3:
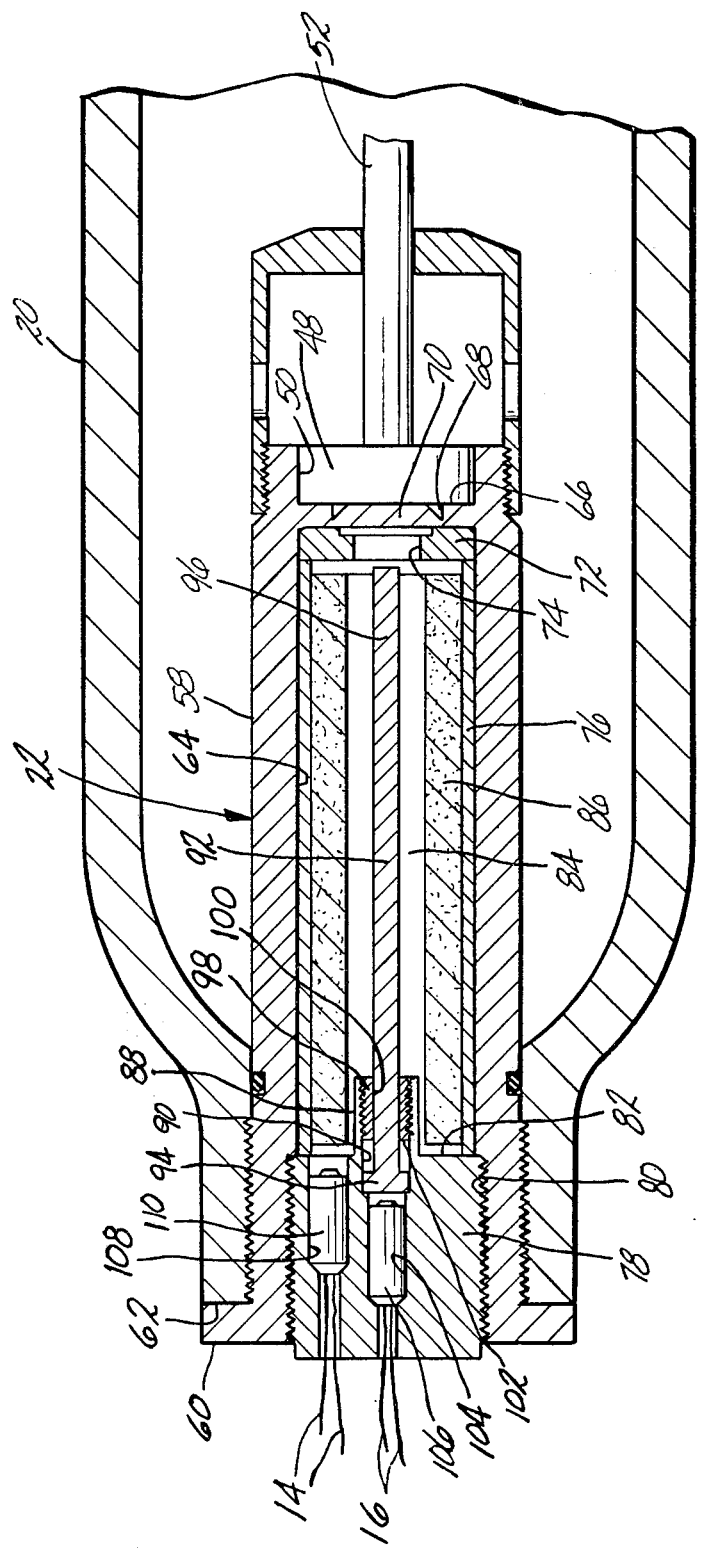
FIG. 3 is an enlarged cross-sectional view showing one embodiment of the propellant housing of the inflating unit shown in FIG. 2.

The propellant storage means 22, shown in detail in FIG. 3, includes a generally cylindrical housing member 58 which is threadedly secured to the reduced end of the reservoir 20. A flange 60 on the housing member 58 abuts against the end face 62 of the reduced portion of the reservoir 20. The housing includes a bore 64 extending inwardly from its outer end, the bore 64 being separated from the bore 50 in the inner end of the housing member 58 by means of a web 66. The web 66 is provided with a circular groove 68 therein which forms a rupturable closure portion 70 designed to break loose from the remainder of the web when subjected to a predetermined pressure.

A nozzle member 72 having an orifice 74 of a predetermined throat area is mounted in bore 64 next to the web 66. A sleeve member 76 extends within bore 64 between the nozzle 72 into abutting relationship with an end cap 78 which is threadedly secured within a counterbore 80 in the outer end of the propellant storage means 22. The inner end face 82 of the end cap 78 together with the inner surface of the sleeve 76 and nozzle 72 define a propellant chamber 84 in which is mounted a suitable propellant charge 86. The propellant charge 86 may be of any suitable type capable of generating a hot non-toxic gas when ignited and mixed with the fluid of the reservoir 20. The propellant charge 86 may be in the form of loose powder, a single gas generating grain, or a plurality of large grains.

An extension portion 88 extends from the end face 82 of the end cap 78 toward the nozzle member 72. A bore 90 is provided in the extension portion 88 and extends a portion of the way into the main body of the end cap 78. A rod member 92 has a head portion 94 which is mounted in the bore 90. The reduced portion 96 of the rod member 92 extends from the end cap 78 to a point slightly rearward of the orifice 74 of the nozzle member 72 and is in alignment therewith.

A stop member 98 is threadedly secured within the bore 90 in the extension portion 88 of the end cap 78 and has an aperture 100 therethrough, through which the reduced end portion 96 of rod member 92 extends. The enlarged head portion 94 is spaced a predetermined distance from the end face 102 of stop member 98 so that the rod member can move toward the nozzle member 72 a predetermined distance into the throat area thereof and decrease the throat area.

A suitable bore 104 is provided in the end cap 78 in alignment with the rod member 92. An ignitor member 106, such as a squib member mounted in a suitable housing, is contained within the bore 104 and is connected to the sensing means 12 by suitable electrical leads 16. A bore 108 is also provided in the end cap 78 in which is mounted a second ignitor member 110, such as a squib member in a suitable housing. The ignitor member 110 is in communication with the propellant charge 86 so that when an electrical current is passed through its leads 14 which are connected to the sensing means 12, the ignitor member will be fired to ignite the propellant charge 86 in the propellant chamber 84.

As stated before, the inflator 4 is to be used in a system having both slow or low level and fast or high level deployment. In the case of a vehicle, low level deployment may be used in connection with those crashes occuring when the vehicle is traveling at low rates of speed. The high level deployment could be used for vehicles traveling at high rates of speed. Depending upon the particular vehicle and other parameters, low level deployment might be used during vehicle speeds of 15 to 20 miles per hour while high level deployment would be used for vehicle speeds over 20 miles per hour.

The sensing means used to initiate the ignitor members 106 and 110 may consist of two separate sensors 112 and 114. Sensor 112 should be designed to sense low level collisions, while sensor 114 should be designed to sense high level collisions. Obviously, in the case of a high level collision, sensor 112 will also be actuated. Such sensing devices may be an accelerometer, inertia responsive switch, or other devices well known in the art. It is contemplated that other sensing means may be used such as a single sensor which would only actuate the low level circuit including leads 14 at a low level crash, but would actuate both electric circuits including leads 14 and 16 at a high level crash.

During low level deployment of the system, when a low speed crash is sensed, ignitor member 110 will be fired by means of the electric current passing through leads 14. The firing of ignitor member 110 causes the ignition of the propellant charge 86 in the propellant chamber 84. The ignition and pressurization of the propellant chamber 84 causes the rupture of the rupturable closure disc 70 and causes the rod 46 to move to the right as viewed in FIG. 2 where it impacts upon the rupturable closure portion 36 to cause the rupture thereof. The hot propellant gas generated by the burning of the propellant charge 86 flows out of the propellant chamber 84 in the interior of the reservoir 20 and mixes with the stored fluid. The mixture of hot gas and stored fluid flows out of the outlet 24 through the apertures 40 in the extensions portion 26, through manifold 8 to the confinement 6 and causes the inflation thereof.

The pressure in the propellant chamber 84 during the burning of the propellant charge 86 therein controls the rate of burning of the propellant charge. The throat area of the orifice 74 should be designed so the propellant charge 86 burns at a relative low pressure and therefor at a relatively slow rate so that the confinement 6 is deployed in a relatively slow manner during low level deployment of the system.

In the event of a high speed crash, and high or fast deployment of the system is desired, ignitor 106 as well as ignitor 110 are fired by means of electric currents being passed through their respective electric leads 14 and 16 from the sensing means 12. The ignitor member 110 functions in the manner as set forth above and serves to ignite the propellant charge 86. The firing of the ignitor member 106 forces the rod member 92 to the left as viewed in FIG. 3 so that the end thereof enters the orifice 74 of the nozzle member 72 and decreases the nozzle throat area. A decrease in nozzle throat area causes an increase in propellant chamber pressure and an increase of burning rate of the propellant charge 86. Due to the faster burning of the propellant and higher pressure, the confinement 6 will be inflated at a faster rate.

Figure 4:
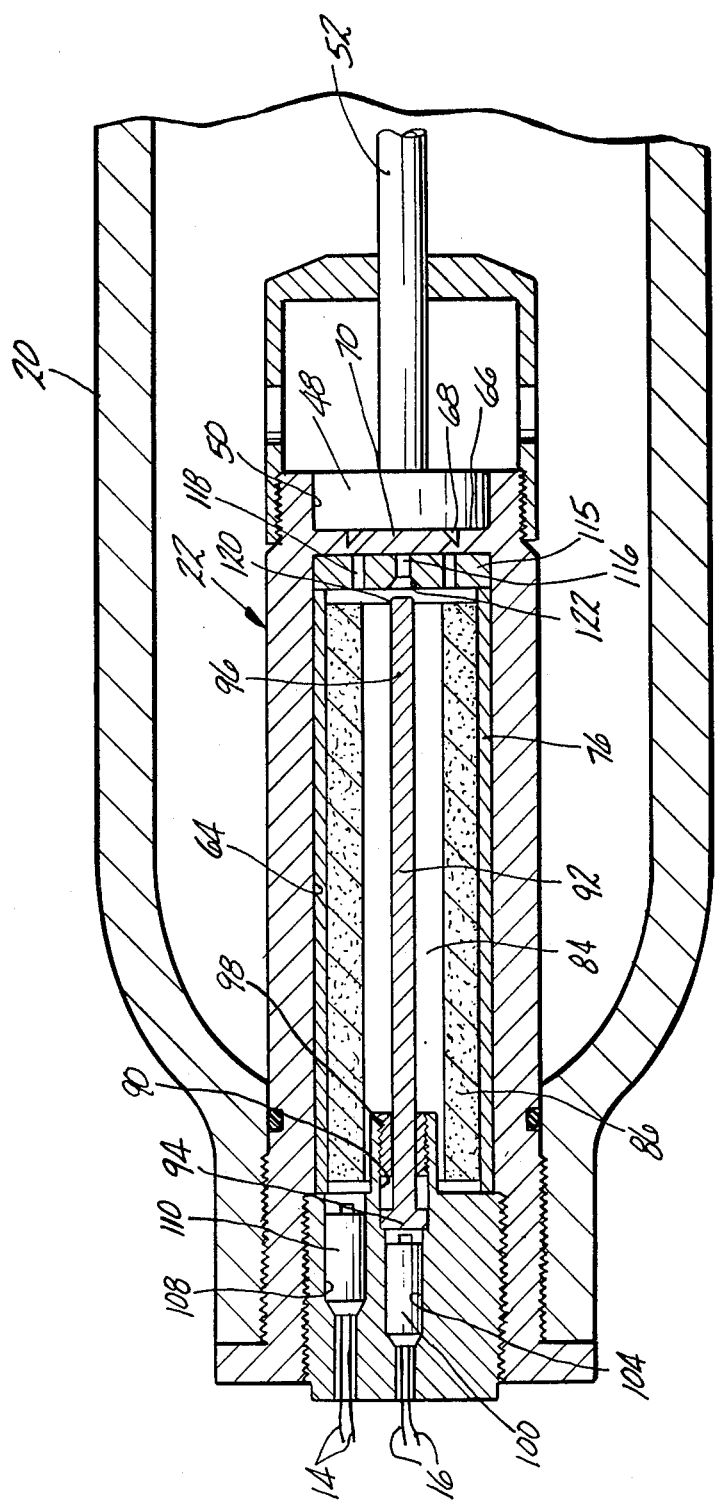
FIG. 4 is an enlarged cross-sectional view of a second embodiment of the propellant chamber which can be used with the inflating unit of FIG. 2.

The embodiment shown in FIG. 4 accomplishes the same function as that of the previously described embodiment but utilizes a slightly different nozzle arrangement. In this case, the nozzle member 115 is provided with at least two orifices 116 and 118. Orifice 116 is in alignment with the rod member 92 and may be provided with a slight taper 120 at the end of its reduced portion 96. Orifice 116 may also have a slight taper 122 at its opening to mate with the tapered portion 120 of the rod member 92.

The operation of this embodiment is similar to that of the previously described embodiment. When ignitor member 110 is fired during low level deployment, the propellant charge 86 will be ignited and burn causing the rupture of the rupturable closure portion 70 a well as causing the rod member 46 to move and rupture rupturable closure portion 36. The gas generated from the burning of the propellant charge 86 will pass through the orifices 116 and 118 in the nozzle member 115 into the interior of the reservoir 20. The mixture of hot gas and stored fluid will pass through the outlet 26 and flow to confinement 6 to cause the inflation thereof.

In the event of a high level crash, when high level deployment of the system is desired, both ignitor members 106 and 110 will be fired. Ignitor member 110 will serve to ignite propellant charge 86 while ignitor member 106 will force rod member 92 to the right as viewed in FIG. 4 and close orifice 116 of the nozzle member 115. This in effect decreases the effective throat area of the nozzle 115 resulting in high pressure in propellant chamber 84 and faster burning of the propellant charge 86, and thus a more rapid deployment of the confinement 6.

By virtue of the above described invention, a dual deployment inflator is provided which utilizes a single propellant chamber and a single propellant charge. The device is capable of having a low level deployment rate when such a rate may be used, and is also capable of a high level deployment rate when that rate is required.

What is claimed is:

1. An apparatus for use in a safety system of the type utilizing an inflatable member, a stored fluid under pressure, and propellant charge means for the generation of a hot gas, said apparatus including fluid storage means for storing a fluid under pressure, propellant storage means for storing a propellant charge, means normally sealing said propellant storage means from said fluid storage means and operable to provide communication between the propellant storage means and the interior of said fluid storage means if the system is actuated, a nozzle between said fluid storage means and said propellant storage means having a predetermined throat area, means for igniting said propellant charge in response to the sensing of a condition wherein slow deployment of the system can be used and for igniting said propellant charge and for reducing the effective throat area of said nozzle means when fast deployment of the system is required, means for releasing the gas generated by the propellant charge and the stored fluid from the fluid storage means if the system is actuated, said nozzle having at least two orifices therethrough, said means for igniting said propellant charge for slow and fast deployment of the system and for reducing the throat area of said nozzle means for fast deployment including ignitor means for igniting said propellant, means for causing the firing of said first ignitor means in response to the sensing of a condition wherein both slow and fast deployment of the system is desired, and means for at least partially closing at least one of said orifices while leaving at least one of said orifices at least partially open in response to the sensing of a condition wherein fast deployment of the system is required, said means for at least partially closing at least one of said orifices includes a rod member in alignment with and spaced from one of said orifices, an ignitor member associated with said rod member, and means for causing the firing of said second ignitor means in response to the sensing of a condition wherein fast deployment of the system is required to move the rod member into a position closing the orifice with which it is aligned.

* * * * *